(12) United States Patent
Grunschloss

(10) Patent No.: US 7,083,321 B2
(45) Date of Patent: Aug. 1, 2006

(54) SINGLE SCREW EXTRUDER

(75) Inventor: Eberhard Grunschloss, Stuttgart (DE)

(73) Assignee: Krauss-Maffei Kunststofftechnik GmbH, Munich (DE)

( * ) Notice: Subject to any disclaimer, the term of this patent is extended or adjusted under 35 U.S.C. 154(b) by 0 days.

(21) Appl. No.: 10/600,217

(22) Filed: Jun. 20, 2003

(65) Prior Publication Data

US 2004/0085852 A1 May 6, 2004

Related U.S. Application Data

(60) Division of application No. 10/081,282, filed on Feb. 22, 2002, now Pat. No. 6,705,752, which is a continuation of application No. PCT/EP00/05919, filed on Jun. 26, 2000.

(30) Foreign Application Priority Data

Jun. 24, 1999 (DE) ............... 199 28 870

(51) Int. Cl.
*B29B 7/42* (2006.01)
(52) U.S. Cl. .................. 366/80; 366/88
(58) Field of Classification Search .............. 366/79, 366/80, 88, 89, 90
See application file for complete search history.

(56) References Cited

U.S. PATENT DOCUMENTS

| 1,427,272 | A | * | 8/1922 | Eger | 366/80 |
|---|---|---|---|---|---|
| 2,471,324 | A | * | 5/1949 | Henning | 366/87 |
| 3,150,411 | A | * | 9/1964 | Daubenfeld | 366/80 |
| 4,013,276 | A | * | 3/1977 | Boham et al. | 366/76.1 |
| 4,125,333 | A | | 11/1978 | Fields | |
| 4,129,386 | A | * | 12/1978 | Rauwendaal | 366/88 |
| 4,300,840 | A | * | 11/1981 | Kishihiro | 366/88 |
| 4,408,887 | A | * | 10/1983 | Yamaoka | 366/75 |
| 4,569,595 | A | | 2/1986 | Maillefer | |
| 4,770,539 | A | * | 9/1988 | Heathe | 366/88 |

(Continued)

FOREIGN PATENT DOCUMENTS

DE 25 14 307 11/1975

(Continued)

OTHER PUBLICATIONS

Maschinenmarkt, Kunststoffverarbeitungstechnik, Zylinder glatt oder, 1989, pp. 40-43.

*Primary Examiner*—Tony G. Soohoo
(74) *Attorney, Agent, or Firm*—Harness, Dickey & Pierce, P.L.C.

(57) ABSTRACT

The invention relates to a single screw extruder comprising a barrier screw and a barrel in which the barrier screw is held in a manner that permits to rotate and comprising at least one feed zone longitudinal section and at least one melting zone longitudinal section (23). The extruder (10) is characterized in that the barrel (11), on the inner wall (50) thereof in the area of the melting zone longitudinal section (23), has at least one groove (52) which runs in a longitudinal direction. The invention also relates to a method for extruding plastic material using a single screw extruder (10) comprising a barrier screw (40) which is held inside a cylinder (11) in a manner that permits it to rotate, whereby the extruder (10) comprises a feed zone (21, 22) and a melting zone (23), and the barrier screw (40) has at least one solid matter channel (49) and a melting channel (48). The method is characterized in that solid plastic material (solid matter) is transported in the area of the melting zone (23) in a defined quantity out of the solid matter channel (49) and into the melt channel (48).

3 Claims, 3 Drawing Sheets

| U.S. PATENT DOCUMENTS | | | | |
|---|---|---|---|---|
| 5,141,326 A | * | 8/1992 | Eshima | 366/88 |
| 5,234,652 A | | 8/1993 | Woodhams et al. | |
| 6,056,430 A | * | 5/2000 | Medici et al. | 366/88 |
| 6,139,179 A | * | 10/2000 | Christiano et al. | 366/80 |
| 6,705,752 B1 | * | 3/2004 | Grunschloss | 366/80 |

| FOREIGN PATENT DOCUMENTS | | |
|---|---|---|
| DE | 25 58 238 | 7/1977 |
| EP | 0 069 271 | 1/1983 |
| JP | 60021228 | 2/1985 |

* cited by examiner

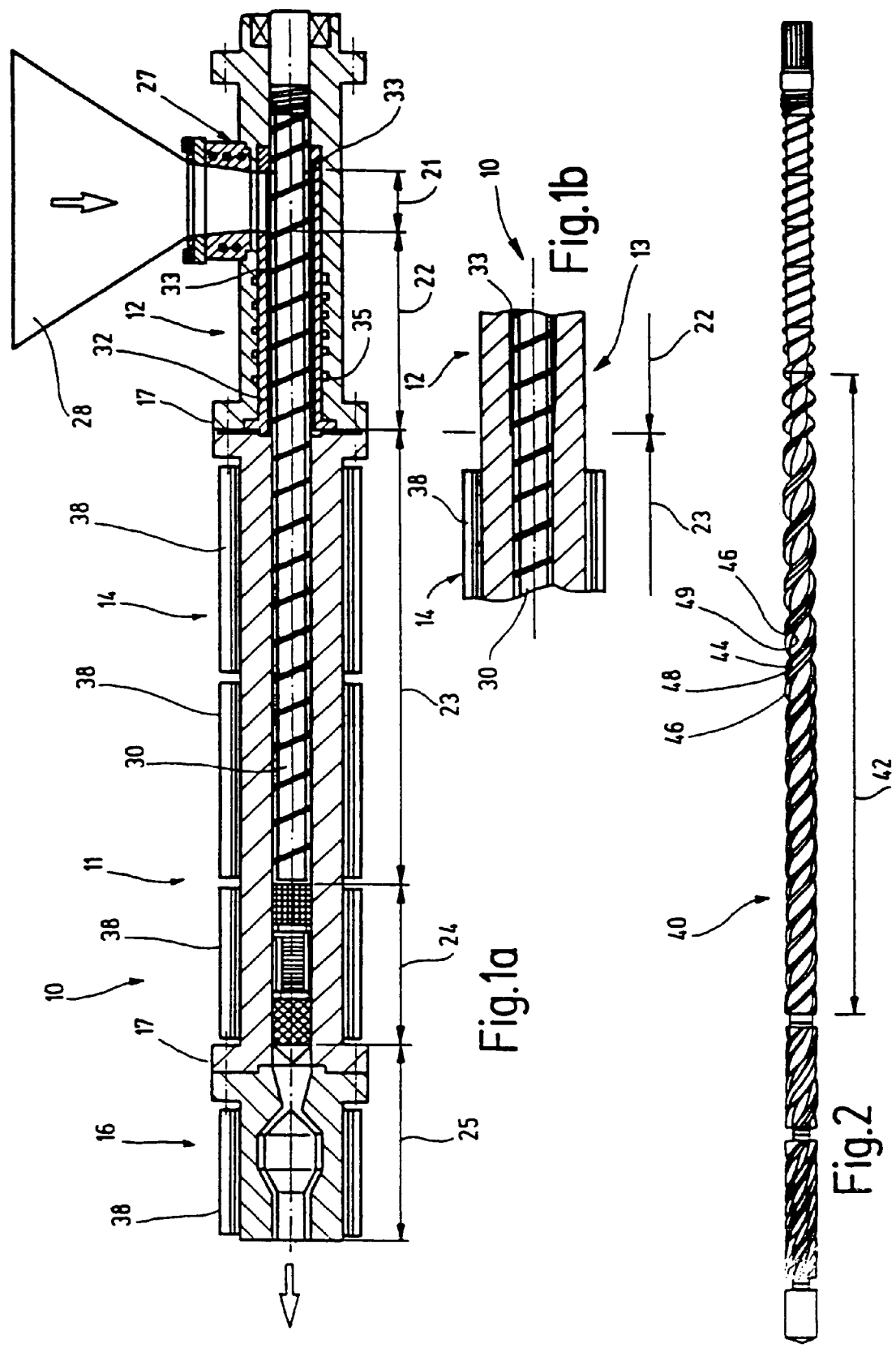

SINGLE SCREW EXTRUDER

CROSS-REFERENCE TO RELATED APPLICATIONS

This application is a divisional of U.S. application Ser. No. 10/081,282, filed Feb. 22, 2002, now U.S. Pat. No. 6,705,752, which is a continuation of PCT Application No. PCT/EP00/05919, filed Jun. 26, 2000 and designating the U.S., which was not published under PCT Article 21(2) in English, and which claims priority of German Application No. 199 28 870.4, filed Jun. 24, 1999.

BACKGROUND OF THE INVENTION

The present invention relates to a single screw extruder comprising a barrier screw and a barrel in which the barrier screw is rotatably mounted and which comprises at least a feed zone longitudinal section and a melting zone longitudinal section. The invention further relates to a method for extruding plastic material using such a single screw extruder.

A single screw extruder having a barrier screw is for example disclosed in the paper "Zylinder glatt oder genutet", Maschinenmarkt, Würzburg 95 (1989) 48, pages 40–43. In this paper different concepts of barrier screws are presented which are used in extruders having smooth or grooved feed areas. The barrels in the area of the melting zone longitudinal sections are formed in a plane and smooth manner for a better separation of melt and solid matter.

A screw housing for an extruder is known from DE 25 14 307, which comprises at least one groove extending across the whole length. This groove serves to avoid a "screw slip", that is a rotation of the screw without a transport of material in the barrel. The screw shown in this document is not a barrier screw.

Generally single screw extruders are known. They typically comprise an extruder plastification barrel in which a screw is rotatably mounted. A powdered or granulated initial material (with stabilizers, slip additives, if required thermoplastic materials being added with fillers and colorings) is fed at one end of the barrel and is transported by the rotating screw through the barrel to a so-called demoulding tool or matrix located at the opposite end. At first, the initial material is conveyed or transported through the so-called feed zone and is thereby compressed. This feed zone is followed by a melting zone and plastification zone, respectively, in which the initial material is melted by friction at the barrel inner surface. The melting process may—particularly when starting the extruder—be supported by an outer heating of the barrel via (mostly electrical) heating elements. Depending on the application the melting zone is followed by a homogenizing zone and a demoulding zone in which the plastified material is prepared for further processing.

In recent years, single screw extruders being based on the so-called barrier screw concept have gained acceptance to an increasing extent. In a so-called barrier screw, the screw channel is divided in a solid matter channel and a melt channel by way of a further side bar. Compared with the primary side bar, being known from conventional screws, the smaller formed barrier side bar allows a transverse flow of melt from the solid matter channel into the melt channel. The cross-section of the melt channel increases in a downstream direction whereas the cross-section of the solid matter channel continuously decreases in the downstream direction as to maintain the desired conveying effect of the screw. Due to the so-called barrier zone particularly the heat transfer from the barrel and the screw surface to the granulate not yet melted is improved.

Although this barrier screw concept has been proven practical for many applications still remains it the need to increase the performance of the single screw extruder with barrier screw while keeping the necessary structural measures as low as possible.

SUMMARY OF THE INVENTION

The object of the present invention is, therefore, to improve the single screw extruder based on the barrier screw concept so that the performance, particularly the output and the pressure build-up capability as well as the melting performance, is increased.

The object underlying the present invention is solved by a single screw extruder of the aforementioned kind in that the barrel comprises at least one groove extending in a longitudinal direction and formed in the barrel's inner surface in the area of the melting zone longitudinal section.

By way of combining a barrier screw with a barrel comprising at least one groove along the melting zone, a substantial increase of output compared to conventional barrier screw extruders is achievable. This is particularly the result of an improvement of the melting process of the initial material. This may substantially be put down to the fact that the solid matter gets caught in the groove and, therefore, enters the melt channel only in small quantities. This also leads to the advantage that the heat transfer is substantially improved since the barrel surface in the area of the grooves comes in contact with the solid matter. In the prior known barrels with a smooth surface the melt quasi forms a heat barrier, at least said smooth surface made worse the heat transfer from the barrel surface to the inside.

The mentioned improvement of the melting process and the heat transfer allows to increase the rotational speed directed output without having to provide additional structural measures. In view of the prior single screw extruders it was necessary for increasing the output to increase the length of the melting zone and/or the rotational speed of the screw. However, an increased rotational speed results in an undesired heating process of the melt in the extruder which may cause damages of the initial material. Otherwise the melt must be more cooled down afterwards which in turn results in additional structural measures.

Additional structural measures are therefore not necessary with the single screw extruder according to the present invention. The object of the present invention is hence completely solved.

In addition to the aforementioned advantages the single screw extruder with barrier screw according to the present invention has the advantage that the pressure build-up capability is improved. Compared to the known single screw extruders it is not necessary any more to build up a very high pressure in the so-called feed zone as to enable a predetermined lower pressure at the end of the single screw extruder. With the single screw extruder according to the present invention it is possible to substantially reduce the pressure between the feed zone and the melting zone. This in turn results in a reduction of wear of the screw in the transition area between the feed zone and the melting zone since it is operated with lower pressures.

Due to the pressure reduction in the area of the feed zone it does not have to be constructed any more as complicated as in prior solutions and does not have to be provided with cooling means and a "heat separation" towards the heated melting zone. Advantageously, the feed zone and the melting zone may therefore be formed individually.

In a preferred embodiment of the present invention the groove extends parallel to the longitudinal axis of the barrel (axial groove), wherein more preferably the grooves extend helically in the feed zone.

It has been shown that the axially extending form of the groove provides optimal results particularly in view of the output and the pressure build-up, however, without deteriorating the melting process and the homogeneity of the melt, respectively. Of course, a helically arranged groove may also be contemplated.

In a preferred embodiment the barrel comprises several grooves being equally spaced apart in circumferential direction which grooves extend preferably parallel to the longitudinal axis of the barrel.

This has the advantage that the process of matching the grooves is simplified compared with the groove helically arranged.

In a further preferred embodiment the width and/or the depth of the groove varies in a longitudinal direction, preferably the grooves depth decreases towards the downstream end of the melting zone section, preferably to zero.

In a further preferred embodiment of the invention at least one groove is provided also in the barrel inner surface (innerwall) in the area of the feed zone section, the groove extending parallel or helically relative to the longitudinal axis. Preferably, the groove in the area of the feed zone section leads into the groove in the area of the melting zone without transition. Preferably both grooves have the same lead angle.

This has the advantage that the groove extends continuously without any break along the feed zone and melting zone thereby further improving the output and the pressure build-up.

In a preferred embodiment the barrel is formed as a one-piece barrel and is preferably provided with a constant inner diameter. This measure has the advantage that the conventional and structurally complicated separation into a feed zone with a cooled grooved liner and a heated melting zone may be omitted. Thereby manufacturing costs may be saved. Moreover, due to the good output of the overall system a cooling of the feed zone may be omitted which leads to operation cost savings.

In a further preferred embodiment the barrier screw is formed with two or more channel pairs so that two or more solid matter channels and two or more melt channels are created.

This has the advantage that the melting performance of the single screw extruder may be improved compared with the one channel paired barrier screw. Additionally, the abrasive wear at the primary side bar of the screw may be minimized thereby.

The object underlying the present invention is also solved by a method of the aforementioned kind which is characterized in that in the area of the melting zone solid plastic material (solid matter) is transported in a defined quantity out of the solid matter channel into the melt channel. Preferably, the solid matter is transported out of the solid matter channel into the melt channel at predetermined locations along the barrel. Most preferred, the transport of the predetermined quantity of solid matter is caused by the pressure difference between the solid matter channel and the melt channel.

Further advantages and embodiments of the invention will be apparent from the following description and the drawings.

It is understood that the features recited above and those yet to be explained below can be used not only in the respective combination indicated, but also in other combinations or in isolation without leaving the context of the present invention.

BRIEF DESCRIPTION OF THE DRAWINGS

The invention will now be explained with one embodiment and with reference to the drawings. In the drawings:

FIG. 1a schematically shows a cross-sectional view of a single screw extruder according to a first embodiment;

FIG. 1b schematically shows a cross-sectional view of a portion of a single screw extruder according to a second embodiment;

FIG. 2 is a diagram of a barrier screw;

DETAILED DESCRIPTION OF THE PREFERRED EMBODIMENTS

Figure 3:
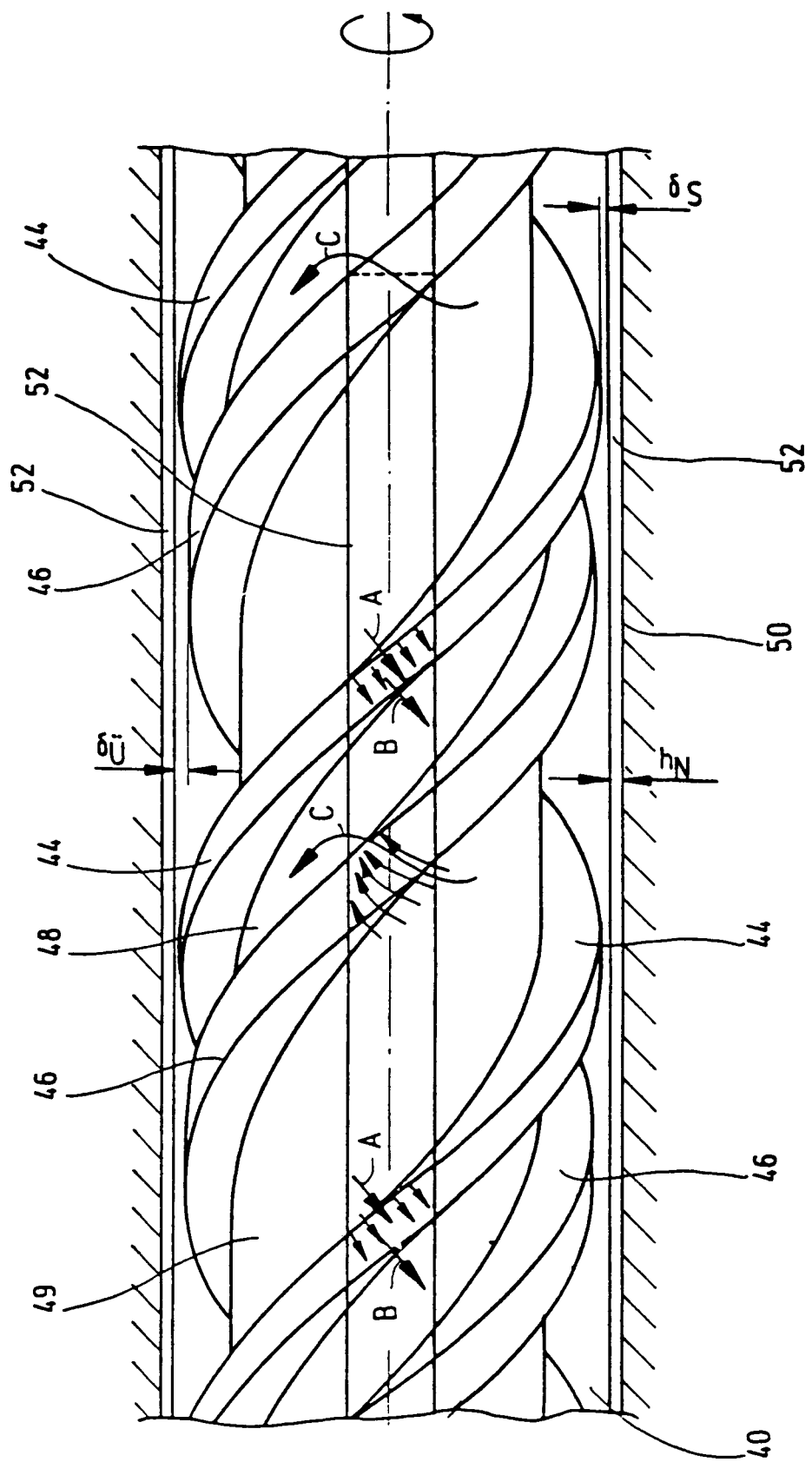
FIG. 3 is a diagram of a longitudinal section of the extruder in the area of the melting zone.

In FIG. 1a, a single screw extruder for extruding a plastic material is designated with reference numeral 10. As will readily be understood by those skilled in the art, the term "extruder", as used throughout the specification and claims to describe the present invention, is used in its generic sense to identify the screw feed assembly per se. The term "extruder" is not intended to limit the application of the present invention to an extrusion machine or to preclude its use in other well known applications, such as for example the feed mechanism of an injection molding machine, which is sometimes referred to as a "plasticizing unit". The single screw extruder 10 (hereinafter simply called extruder) comprises a tubular barrel 11 which is made up of three single tubular barrel assemblies 12, 14, 16 in the present embodiment. The connection of the single assemblies 12, 14, 16 is achieved by respective flanges 17.

The barrel 11 is divided in multiple functional longitudinal sections, namely a filling zone 21 followed by a feed zone 22, a melting zone 23, a homogenizing zone 24 and finally a demoulding zone 25. In FIG. 1a, the filling zone 21 forms the right end and the demoulding zone 25 forms the left end of the barrel 11.

Within the barrel 11, a screw 30 is coaxially and rotatably mounted therein. For clarity reasons neither the screw drive nor the screw bearings are shown. Moreover, for clarity reasons the diagram does also not show that the screw according to the present invention is formed as a barrier screw. A more detailed description of the barrier screw follows hereinafter. The screw 30 extends from the screw shaft and the filling zone 21 to the end of the homogenizing zone 24. In the assembly 12 of the barrel 11 an opening 27 is provided in the area of the filling zone 21, the opening allowing a connection from outside into the inner space of the barrel 11. For improving the feeding of initial material a funnel 28 is mounted on the opening 27.

FIG. 1a further shows that the assembly 12 comprises an inner liner 32 which is inserted into the tubular assembly 12. The liner 32 comprises axial grooves formed at its surface facing the screw 30. In FIG. 1a, two of these grooves are designated with reference numeral 33. Typically, the liner 32 comprises a plurality of axial grooves equally spaced apart to each other in a circumferential direction. The depth of the grooves 33 in the area of the fill zone 21 is at a maximum and generally decreases continuously in the transport direction. At the end of the feed zone 22 the groove depth is generally zero.

The liner 32 is surrounded by ring shaped or helically shaped cooling channels 35, neither the coolant input nor the coolant output being shown for clarity reasons.

The tubular barrel assembly 14 is surrounded by schematically illustrated heating elements 38, the heating elements 38 extending across the whole length of the assembly so that both the melting zone 23 and the homogenizing zone 24 are heatable by these heating elements 38. In the aforementioned embodiment multiple heating elements 38 are arranged one behind the other in longitudinal direction. A further heating element 38 also surrounds the third assembly 16 in the area of the demoulding zone 25. The heating element could also be provided with cooling elements as to reject surplus friction heat caused by a higher rotational speed of the screw.

In the embodiment of the extruder 10 shown in FIG. 1a, both assemblies 12 and 14 are connected with each other via a flange 17. It is of course also possible to integrate both assemblies 12, 14 into one assembly 13 so that a flange connection could be avoided. This embodiment of an extruder 10' which is improved in view of structural efforts is also shown in FIG. 1b as a partial view. Beside the integral form of the assembly 13 it can be seen that neither a grooved liner 32 nor a cooling in form of cooling channels 35 are provided. The portions of the extruder 10' not shown, however, correspond to that of extruder 10 of FIG. 1a. Further, in both FIGS. 1a, 1b alike parts are designated with alike reference numerals so that it can be refrained from describing these parts again.

Such an extruder 10 and 10', respectively, generally performs the following functions:

A mostly granulated initial material made of plastic is fed into the funnel 28, which then passes the opening 27 and enters the filling zone 28. By rotating the screw 30 this initial material is transported (conveyed)—in FIG. 1 to the left-hand side. By a respective design of the screw 30 and the grooves 33 the initial material is compressed in the feed zone 22. Due to the pressure build-up which is supported by the grooves 32 a cooling of this portion via the cooling channels 35 is necessary. After having passed the feed zone 22 the compressed initial material (solid matter) enters the melting zone 23 in which a melting of the solid matter occurs by friction of the solid matter at the barrel inner surface and/or by heating via the heating elements 38. At the end of the melting zone 23 the melt enters the homogenizing zone 24 in which the correspondingly formed screw 30 performs a melting of solid matter yet present. Further, in this zone additives may be mixed effectively. The homogenized melt finally enters the demoulding zone 25 where the melt is prepared for further processing.

The output of the extruder 10 substantially depends on the rotational speed of the screw 30. A desired increase of the output could therefore be achieved by increasing the rotational speed. However, then the problem arises that the degree of homogeneity of the melt at the end of the melting zone 23 deteriorates because many solid matter particles have passed the melting zone 23 too fast. Moreover, the melt film created at the barrel inner surface acts like a heat insulator which prevents an effective heat transfer from the heat/cooling elements 38 to the solid matter.

An improvement of performance compared to a conventional screw is provided by a so-called barrier screw, which is schematically illustrated in FIG. 2 and which is designated as screw 30 in the extruder 10 of FIG. 1a. The barrier screw as such is known so that a description of the detailed structure and function can be avoided. A description of the function of such a barrier screw is, for example, disclosed in "Der Einschnecken-Extruder—Grundlagen und Systemoptimierung", VDI-Verlag 1997.

In FIG. 2, a barrier screw is designated with the reference numeral 40. The barrier screw 40 comprises multiple longitudinal sections, only the longitudinal section designated with reference numeral 42 being of importance for the following description. This longitudinal section 42 is located within the melting zone 23 of the barrel 11 in the built-in condition. The barrier screw 40 is characterized in that it comprises a so-called barrier side bar 46 beside the primary or main side bar 44.

Figure 4A:
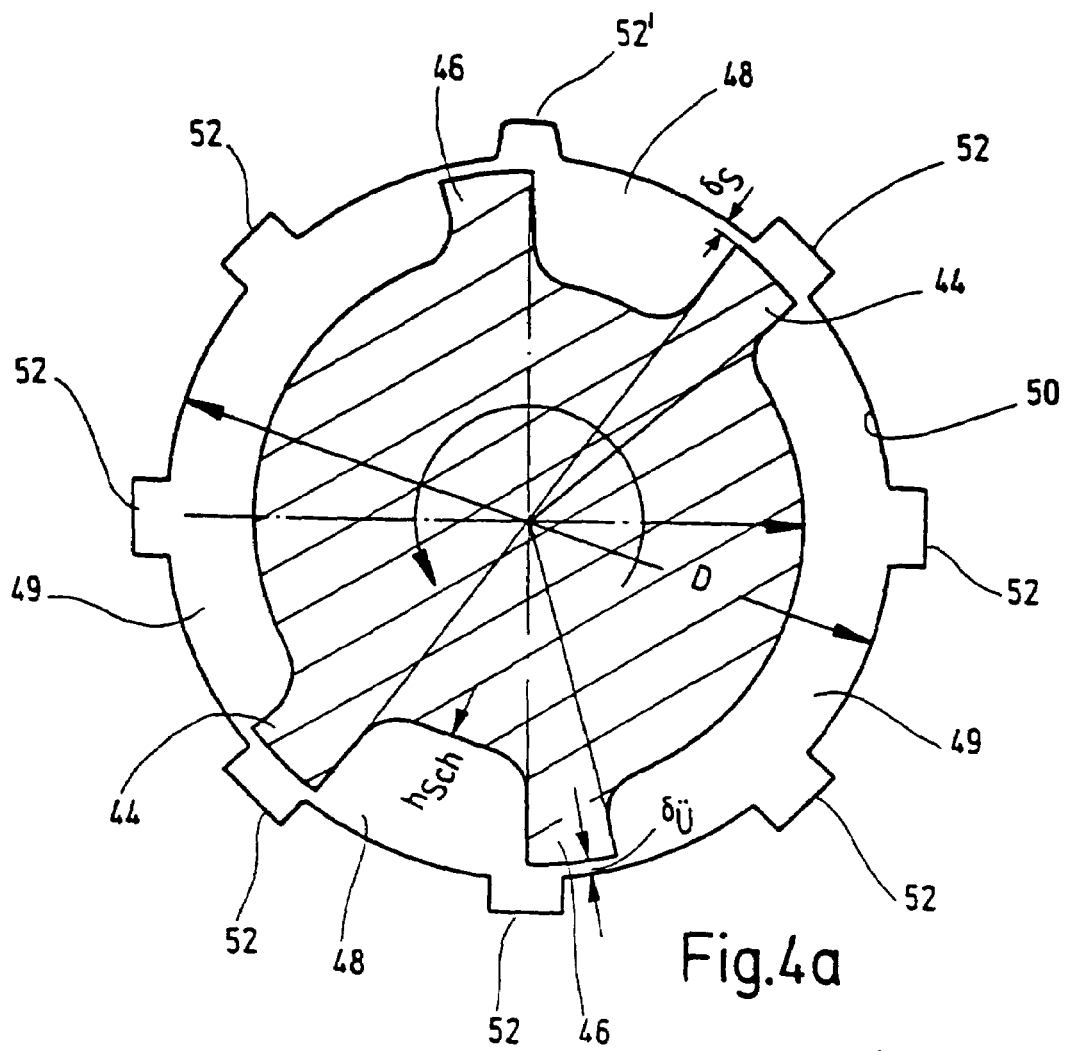
FIG. 4a is a diagram of a cross-section of the barrier screw in a two-channel design.

The primary side bar 44 and the barrier side bar 46 following in downstream direction form together a melt channel 48 and the primary side bar 44 and the barrier side bar 46 following in upstream direction form together a solid matter channel 49. FIG. 2 yet shows that the width of the solid matter channel decreases towards the downstream end of the longitudinal section 42, whereas the width of the melt channel 48 increases. The particular function of the barrier screw 40 is among other things based on the fact that the gap between the barrel inner surface and the primary side bar is smaller than the gap between the barrier side bar 46 and the barrel inner surface. This may be especially seen in FIG. 4a in which a barrier screw having two channel pairs is illustrated as a sectional view. In FIG. 4a both diametrically opposed primary side bars 44 and both also diametrically opposed barrier side bars 46 can be clearly seen. In FIG. 4a, the gap between the primary side bar 44 and the inner surface 50 of the barrel 11 (blocking gap) is designated with $\delta_s$ and the gap between the barrier side bar 46 and the inner surface 50 (barrier gap) with $\delta_{\ddot{u}}$.

In barrier screws $\delta_s$ is generally smaller than $\delta_{\ddot{u}}$. As already mentioned the solid matter channel is formed between a barrier side bar 46 and a primary side bar 44—when seen in conveying direction—and the melt channel 48 is formed between the primary side bar 44 and the following barrier side bar 46. Two of such solid matter channels 49 and two melt channels 48 are provided in the two channel paired embodiment shown herein.

Figure 4B:
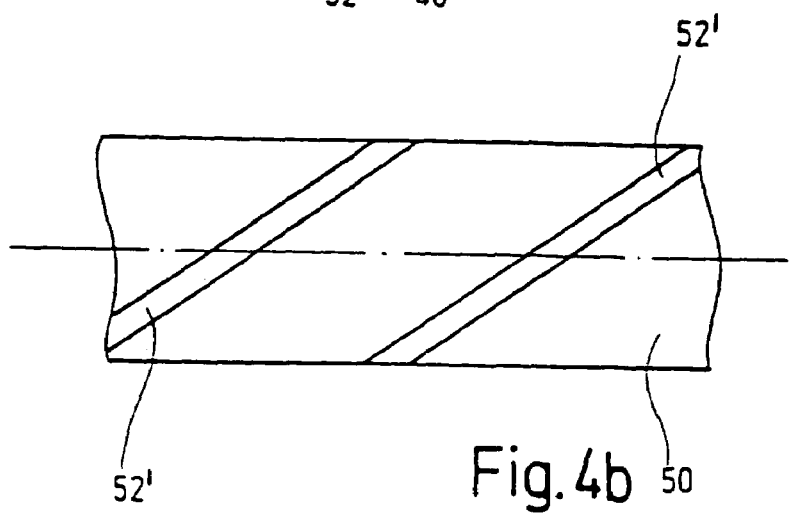
FIG. 4b is a diagram of a portion of the inner surface of the barrel.

According to the present invention grooves 52 are formed in the inner surface 50 of the barrel 11 in the area of the melting zone 23. In the present embodiment shown in FIG. 4a a total of eight grooves 52 are provided which extend in axial direction and which are equally spaced apart to each other in a circumferential direction of the barrel. Further, the grooves have a rectangular cross-section. However, it is particularly advantageous to provide the grooves 52 such that no sharp edges are created. Merely as an example, a single groove 52' having rounded edges is shown in FIG. 4a. It is of course also possible and advantageous to provide one or a plurality of helically arranged grooves 52' as illustrated in FIG. 4b, instead of a plurality of axial grooves 52.

The grooves 52 have a depth which may be substantially in the same order as the width of the primary side bar 44 and the barrier side bar 46, respectively. The depth of the grooves 52 has to be selected dependent on the application and it must be paid attention that the depth is not selected too large since otherwise a deterioration of the function is expected. Both the groove depth as well as the groove width can vary in a longitudinal direction of the barrel 11 and the groove depth runs substantially to zero preferably in the downstream end area of the melting zone 23. This tapered end of the grooves 52 has been proven as particularly advantageous.

In FIG. 3, a longitudinal section of the barrel 11 in the area of the melting zone 23 is again schematically illustrated. The barrier screw 40 comprises two helically extending primary side bars 44 and two respectively spaced apart also helically extending barrier side bars 46. As already mentioned, a primary side bar 44 and a barrier side bar 46 each restricts the melt channel 48 and the solid matter channel 49, respectively. In FIG. 3, a total of three grooves 52 can be seen each having a groove depth $h_N$.

The grooves 52 may be formed differently in the area of the melting zone 23 than in the area of the feed and solid matter zone 21, 22. As to achieve very small solid matter particles a relatively high number of narrow flat helically or axially extending grooves can be provide in the barrel's inner surface of the melting zone 23. This results in an increase of the effective heat transfer area resulting in an improvement of the melting process.

In operation of the barrier screw 40 in the barrel section 23 provided with grooves 52, the following occurs:

The screw section in the feed zone 22 presses the solid matter into the solid matter channel 49 of the barrier screw 40 in the melting zone 23. The solid matter is hence pressurized in the solid matter channel 49 and in case of the desired high output, the pressure is generally higher than the pressure in the melt channel 48. Due to the pressure difference between the solid matter channel 49 and the melt channel 48 the solid matter tries to enter the melt channel 48. Due to the selected gaps between the side bar 46, 44 and the inner surface 50 only the melted solid matter enters the melt channel 48 as melt passing the barrier side bar 46. The gap between the primary side bar 44 and the inner surface 50 is too small also for melt. Because according to the present invention grooves 52 are provided in the inner surface 50 of the barrel 11, the gap between the inner surface and the primary side bar 44 and the barrier side bar 46, respectively, increases every time the respective side bar passes the groove 52. This has the result that the solid matter pressed into the groove 52 enters the melt channel 48 in small quantities. For example, in FIG. 3 it is indicated with A, that solid matter is pressed into the groove 52 displacing the melt in the groove therewith. This displaced melt flows into the melt channel 48 what is indicated with B. Additionally the mixture of solid matter and melt in the grooves 52 is pressed into the melt channel 48, as indicated by C. These "small doses" of solid matter are more or less melted in the melt channel 48. Inhomogeneities which will probably be there at the end of the melting zone 23, are eliminated in the following homogenizing zone 24. However, this passing-over of solid matter leads to the result that the pressure in the solid matter channel can be reduced significantly with the result that also the abrasive wear of the screw 30 and the barrel 11 can be reduced.

Because the solid matter enters the melt channel 48 in small defined quantities in an early stage, an early mixture of melt and small solid matter particles can be performed so that on the one hand the resulting melt temperature can be kept on a low level also at a high rotational speed in an advantageous manner and on the other hand the homogeneity of the melt can be ensured.

As mentioned above, the barrier gap is generally greater than the blocking gap. However, it is also possible that the barrier gap is greater than or equal to the blocking gap. In a production-oriented very simple embodiment the barrier gap can be equal to the blocking gap which prevents a separate grinding of the barrier side bars. Preferably the gap width is selected a little bit greater compared with conventional extruder screws so that the overpressing of melt and solid matter particles is not impeded. Therewith, the resulting melt temperature can also be reduced in an advantageous manner.

The overpressing of melt and small solid matter particles can be made easier preferably by small slots in the barrier side bar and/or the primary side bar, which can extend substantially radially and in a circumferential direction. Although the production-oriented effort is somewhat higher, the possible output, however, is increased and the melt homogeneity and the melt temperature is improved, respectively.

In view of this the grooves according to the present invention provided in the barrel inner surface prevent a deterioration of the homogeneity and the heat transfer in case that the output is increased. The rotational speed of the screw can therefore be increased without additional structural measures, as e.g. an extension of the melting zone, an increase of the measures for heating or cooling the barrel. Further, it has been proved that the grooves show the aforementioned effects particularly in extruders having a barrier screw.

What is claimed is:

1. A method for extruding plastic material using a single screw extruder which comprises a barrel having at least one groove extending in a longitudinal direction along an inner surface thereof and a barrier screw rotatably mounted therein, the extruder comprising a feed zone and a melting zone and the barrier screw comprising at least a solid matter channel and a melt channel, including the step of transporting through said at least one groove in the area of the melting zone solid plastic material (solid matter) from the solid matter channel to the melt channel in defined quantities.

2. Method according to claim 1, wherein the solid matter is transported at defined locations along the barrel from the solid matter channel into the melt channel.

3. Method according to claim 1, wherein the transport of defined quantities of solid matter is substantially caused by the pressure difference between the solid matter channel and the melt channel.

* * * * *